United States Patent
Hall, Sr.

[11] Patent Number: 5,501,542
[45] Date of Patent: Mar. 26, 1996

[54] RAPID COUPLING FOR A SUPPORTED, DRIVEN SHAFT

[75] Inventor: William M. Hall, Sr., Bluffton, Ind.

[73] Assignee: Farmatic Research, Inc., Komoka, Canada

[21] Appl. No.: 311,165

[22] Filed: Sep. 23, 1994

[51] Int. Cl.⁶ ........................................ F16D 1/10
[52] U.S. Cl. .................. 403/306; 403/300; 403/379; 403/DIG. 4; 464/901; 209/369; 209/409
[58] Field of Search ..................... 403/379, 378, 403/354, 300, 301, 302, 305, 306, DIG. 4, 182, 192, 187, 286, 332, 360, 380; 464/901, 153, 119; 209/288, 369, 406, 409

[56] References Cited

U.S. PATENT DOCUMENTS

| | | | |
|---|---|---|---|
| 1,255,356 | 2/1918 | Trust et al. | 403/379 X |
| 3,080,185 | 3/1963 | Walker | 403/300 |
| 3,406,534 | 10/1968 | Chapper | 464/119 X |
| 3,528,263 | 9/1970 | Stern | 464/119 X |
| 4,548,543 | 10/1985 | Lenertz et al. | 403/379 X |
| 4,565,464 | 1/1986 | Nilsson | 403/290 |
| 4,572,682 | 2/1986 | Iwata | 464/119 X |
| 4,619,549 | 10/1986 | Gilbreth | 403/349 |
| 4,871,277 | 10/1989 | Fuchigami | 464/901 X |
| 4,943,182 | 7/1990 | Hoblingre | 403/349 |
| 5,040,779 | 8/1991 | Ogiri et al. | 403/306 X |
| 5,119,922 | 6/1992 | Yamaguchi | 403/301 X |

OTHER PUBLICATIONS

Carter–Day Co., Minneapolis, Minnesota 1983 advertising brochure and attachments.

*Primary Examiner*—Kenneth J. Dorner
*Assistant Examiner*—Harry C. Kim
*Attorney, Agent, or Firm*—Pearne, Gordon, McCoy & Granger

[57] ABSTRACT

A rapid coupling for a supported, driven shaft is disclosed. The coupling includes a coupling sleeve which is axially slidable over a drive shaft but keyed to the drive shaft to ensure that the coupling sleeve rotates with the shaft. The coupling sleeve has a driven end which includes slots for engaging driven pins affixed to a driven shaft. The coupling sleeve slides over and supports the driven shaft in a coupled position. The coupling sleeve is held in the coupled position by a quick release pin received in a bore through the drive shaft. The advantage is a simple coupling that is easily manufactured, the coupling being serviceable in a very restricted space where the driven shaft must be uncoupled without axial movement of either shaft.

15 Claims, 2 Drawing Sheets

5,501,542

RAPID COUPLING FOR A SUPPORTED, DRIVEN SHAFT

TECHNICAL FIELD

The present invention relates to couplings for transferring torque from a drive shaft to a driven shaft, and in particular to a rapid coupling for a driven shaft supported by a drive shaft.

BACKGROUND OF THE INVENTION

The mechanical coupling of shaft elements is well known and many couplings of various design have been invented. Most such couplings require substantially unrestricted access to the shafts to be connected.

Certain equipment such as precision sizing machines for separating free flowing granular materials by particle size or width and thickness require quick disconnect couplings which are functional in a very restricted space available within the machine housing. Particle sizers are widely used in the food, seed and plastics industries for sorting, cleaning and sizing granular materials such as seeds, pellets and particles. In order to provide versatile machinery, particle sizers are constructed to accommodate interchangeable sizing drums. Materials are sorted by passing material through perforated drums which permits undersized materials to drop through the perforations. A series of drums permit the separation of granular materials into several size grades. It also permits the cleaning of food stuffs such as cereal grains and the like. The drums in a precision sizer are typically supported on one end by a roller arrangement and on the opposite end by a driven shall connected to the drum. A coupling is required at the driven shaft end for transmitting rotational torque to the driven shaft and for supporting the driven shall and the drum. Although precision sizers have been in widespread use for more than 100 years, a simple coupling which is easily operated in the confined space available within the sizer cabinet and which permits a rapid change of drums as well as reliable operation has not, heretofore, been invented.

Many coupling devices have been invented but most are not suitable for use in the restricted space available in a precision sizer machine. U.S. Pat. No. 4,943,182 entitled RAPID FASTENER OF THE BAYONET TYPE to Hoblingre is typical of an inventive concept useful for connecting certain drive shafts but unsuitable for use in an application where the driven shaft must be lifted in a lateral direction away from the drive shaft without any axial movement of either shaft. While solutions to this problem have been sought, all couplings used in precision sizing machines known to date have been complicated, expensive to manufacture and more or less difficult to use.

SUMMARY OF THE INVENTION

It is a primary object of the invention to provide a rapid coupling which is mechanically reliable and easy to operate.

It is a further object of the invention to provide a rapid coupling which is inexpensive to manufacture.

It is yet a further object of the invention to provide a rapid coupling which may be used in restricted spaces where axial movement of the drive shaft and the driven shaft during coupling and decoupling cannot be accommodated.

It is a further object of the invention to provide a simple mechanical coupling having a minimum of components.

These and other objects of the invention are realized in a rapid coupling for coupling a drive shaft to a driven shaft, comprising a coupling sleeve having a drive end, a driven end and an axial bore that extends from the drive end to the driven end and is sized to accommodate the drive shaft and the driven shaft and be axially slidable over the shafts, the driven end including slots for receiving driven pins affixed to the driven shaft; key means for connecting the coupling sleeve to the drive shaft for rotation therewith, the key means permitting axial movement of the coupling sleeve while inhibiting rotational movement of the coupling sleeve on the drive shaft; and locking means associated with the drive shaft for locking the coupling sleeve in a coupled position wherein the coupling sleeve receives an end of the driven shaft, the driven pins are received in the slots and the driven shaft is supported for axial rotation with the drive shaft.

A simple coupling in accordance with the invention is provided by a coupling sleeve having an internal bore which accommodates the drive shaft and the driven shaft to permit the coupling sleeve to be axially slidable over the shafts. The coupling sleeve is keyed to the drive shaft so that reciprocal axial movement is permitted but rotational movement is inhibited. The coupling sleeve may be keyed using a radial pin received in opposed axial key ways in the coupling sleeve or by a feather key, or the like. In a coupled position, the coupling sleeve surrounds the driven shaft. The coupling sleeve transmits the torque to the driven shaft through at least one radial pin in the driven shaft which engages slots in a driven end of the coupling sleeve. A quick release pin installed in a radial bore through the drive shaft is preferably used to retain the coupling sleeve in the coupled position. This provides a low cost, reliable retainer which is easily maintained. To decouple a driven shaft, the pin is removed from its radial bore and the coupling sleeve is slid axially over the drive shaft until the driven shaft is released. The driven shaft is connected using the opposite sequence. Thus, an extremely simple rapid coupling is provided for use in restricted spaces where light to medium duty torque transmission is required.

BRIEF DESCRIPTION OF THE DRAWINGS

The invention will now be further described by way of example only and with reference to the following drawings wherein.

DETAILED DESCRIPTION OF THE PREFERRED EMBODIMENT

Figure 1:
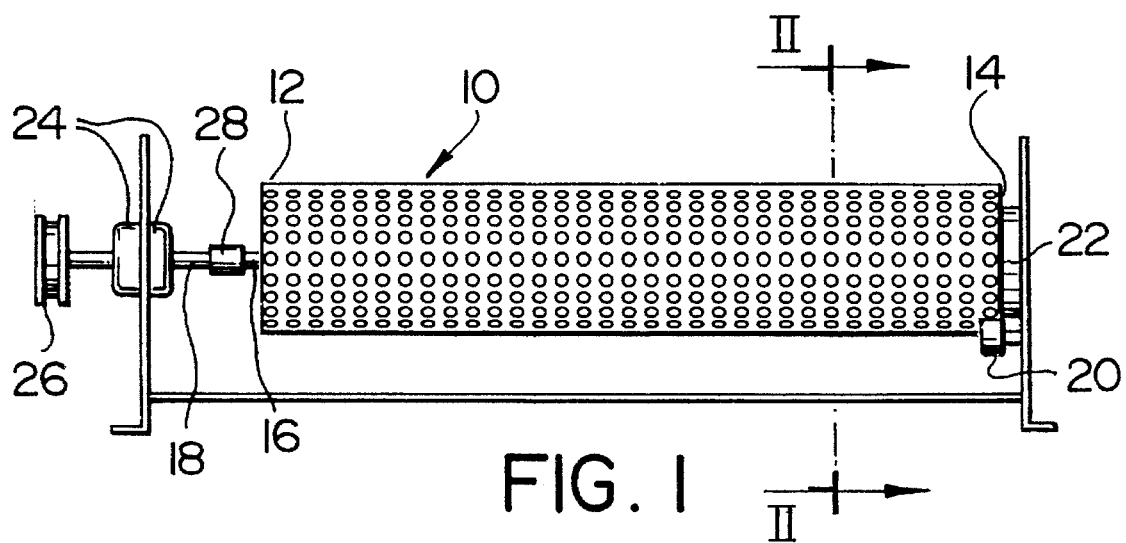
FIG. 1 is a cut-away view of a typical construction for a precision sizing machine showing only a sizing drum and supporting drive structure for the drum.
Figure 2:
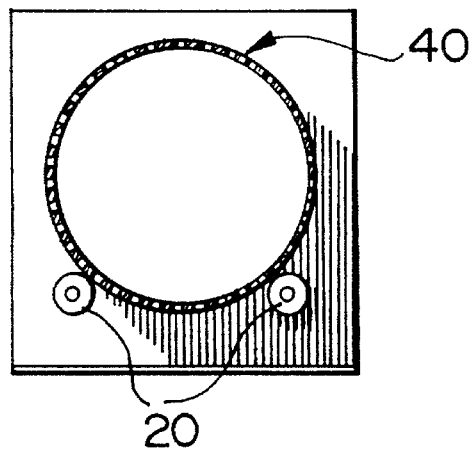
FIG. 2 is a cross-sectional view taken along lines II—II of FIG. 1, showing the supporting arrangement for the idling end of the precision sizing drum.

FIG. 1 shows a cut-away view of a typical construction for a precision sizing machine. Only the components of interest are illustrated. The machine typically includes a sizing drum 10 which may perforated, as illustrated or slotted in a manner well known in the art. Sizing drums are available for sorting particles of various size. In order to provide a versatile machine, the sizing drum must be readily exchangable so that a machine can handle different types and grades of material. Each sizing drum has a driven end 12 and an idler end 14. The driven end 12 includes a driven shaft 16 which rotates with a drive shaft 18, as will be explained hereinafter in more detail. The idler end 14 of the sizing drum 10 is typically supported by a pair of rollers 20, shown in more detail in FIG. 2. The rollers 20 rotatably support an outer periphery of the drum. A seal 22 (see FIG. 1) prevents material to be graded from exiting the idler end of the drum.

The drive shaft 18 is supported by a pair of flange bearings 24 which permit rotation of the drive shaft 18. The drive shaft 18 is rotated by a sheave 26 which is typically belt driven. The drive shaft 18 is connected to the driven shaft 16 by a rapid coupling 28 in accordance with the invention.

Figure 3:
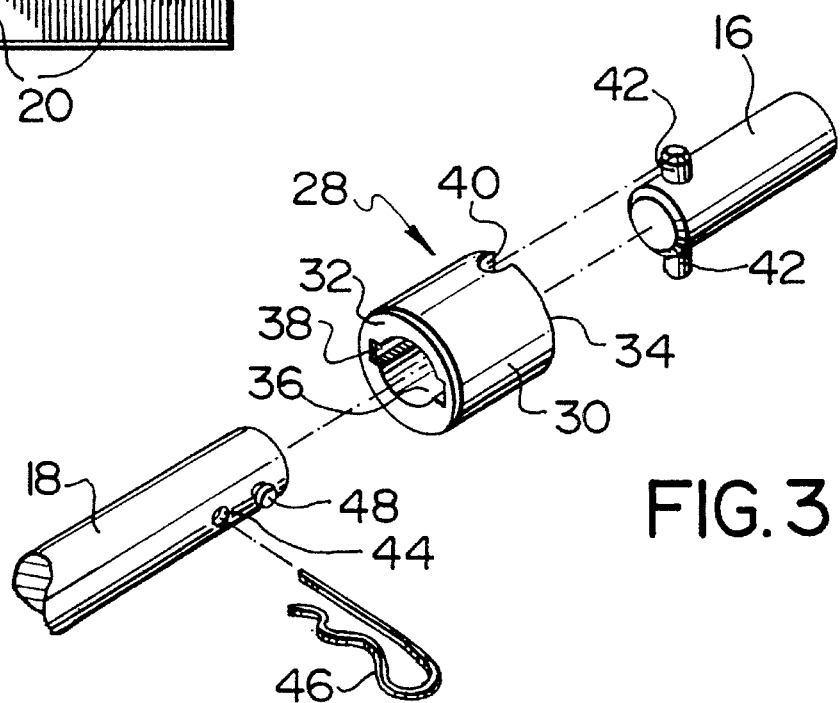
FIG. 3 is an exploded perspective view of the rapid coupling in accordance with the invention.

FIG. 3 shows an exploded perspective view of the rapid coupling in accordance with the invention. The rapid coupling includes a coupling sleeve 30 having a drive end 32, a driven end 34, and an axial bore 36. The axial bore 36 is sized to slidably receive the drive shaft 18 and the driven shaft 16. The drive shaft 18 and the driven shaft 16 are preferably the same diameter although the driven shaft 16 may be larger in diameter than the drive shaft 18, if desirable. The axial bore 36 is further provided with at least one, and preferably two opposed key ways 38 for providing a means for permitting axial movement of the coupling sleeve 30 on the drive shaft 18 while inhibiting its rotational movement on the drive shaft. The driven end of the coupling sleeve 34 includes at least two slots 40 for receiving driven pins 42 affixed to the driven shaft 16. The drive shaft 18 also includes a lock mechanism for locking the coupling sleeve 30 in a coupled position. The lock mechanism is preferably a radial bore 44 which pierces the drive shaft 18. The radial bore 44 receives a quick disconnect self-locking pin such as a hairpin cotter 46. This provides a secure, inexpensive, rapid disconnect locking means for the coupling sleeve 30.

Figure 4:
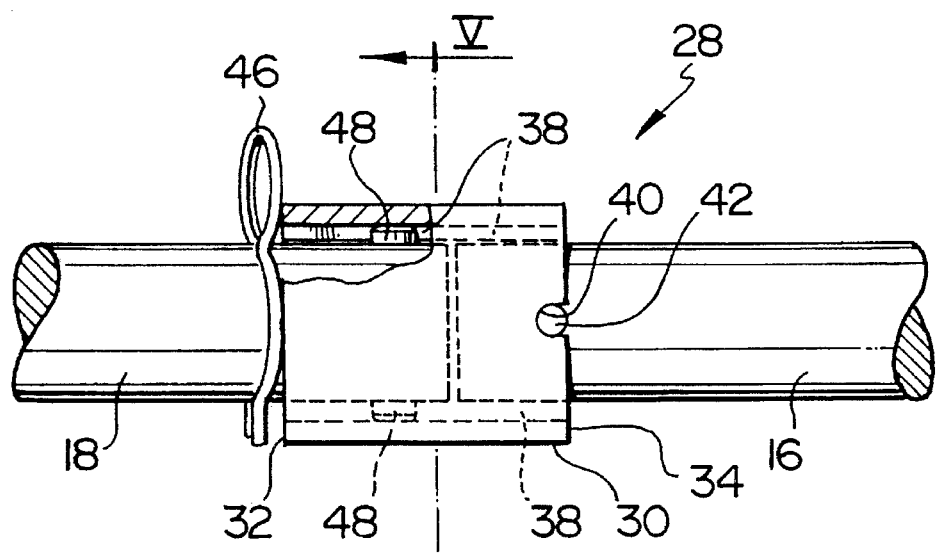
FIG. 4 is a side elevational view of the coupling shown in FIG. 3.

FIG. 4 shows a side elevational view of the rapid coupling 28 in a coupled position. In the coupled position, the driven shaft 16 is supported by the drive shaft 18. Torque is transmitted from the drive shaft 18 to the driven shaft 16 by a key 48 which engages the key ways 38 in the axial bore 36 of the coupling sleeve 30, and by the slots 40 in the driven end 34 of the coupling sleeve 30 which engage the driven pins 42 in the driven shaft 16. As explained above, the coupling sleeve 30 is retained in the coupled position by a quick disconnect self-locking pin 46, such as a hairpin cotter.

Figure 5A:
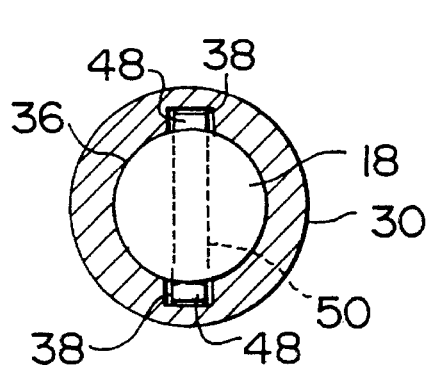
FIG. 5a is a cross-sectional view taken along lines V—V of FIG. 4 showing a key arrangement for transmitting torque from the drive shaft to the coupling sleeve in accordance with the invention.

FIG. 5a shows a cross-sectional view taken along lines V—V of FIG. 4 to illustrate a preferred key configuration for the driven shaft 18. In this embodiment, the key 48 comprises a pin driven through a radial bore 50 in the drive shaft 18. Opposite ends of the pin engage the key ways 38 in the axial bore 36 of the coupling sleeve 30.

Figure 5B:
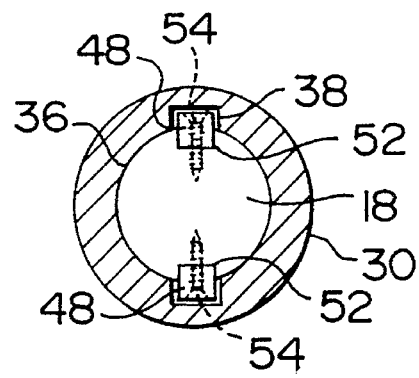
FIG. 5b is a cross-sectional view taken along lines V—V of FIG. 4 showing an alternate key arrangement for the drive shaft.

FIG. 5b shows an alternate key 48 wherein the key comprises a feather key, well known in the art, which is installed in a key slot 52 machined in opposed sides of the drive shaft 18. The feather key is attached to the drive shaft 18 by screws 54, in a manner well known in the art.

Figure 6:
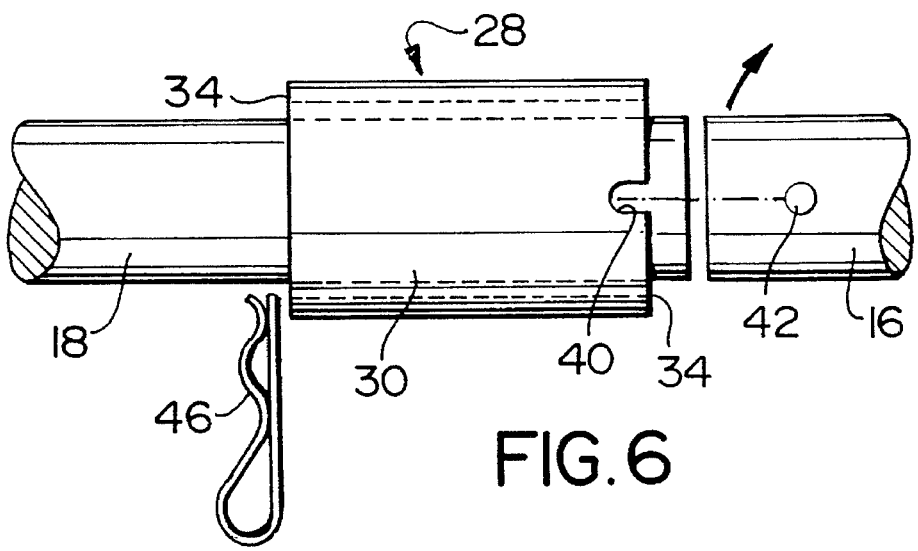
FIG. 6 is a side elevational view of the rapid coupling in accordance with the invention shown in a decoupled position, permitting the driven shaft to be moved radially away from the drive shall.

FIG. 6 shows the rapid coupling in accordance with the invention in a decoupled position for removing the driven shaft 16. As is apparent, the driven shaft 16 can be lifted vertically away from the drive shaft 18 when the coupling sleeve 30 is in the decoupled position. To move the coupling sleeve 30 to the decoupled position, the hairpin cotter 46 is removed from the bore 44 and the coupling sleeve 30 is slid over the drive shaft 18 to release the end of the driven shaft 16, which may be lifted laterally away from the drive shaft 18.

Thus, a simple, inexpensively manufactured rapid coupling is provided for use in restricted spaces where a bayonet type coupling cannot be used.

Although the rapid coupling has been explained with explicit reference to precision sizing machines, use of the rapid coupling is in no respect limited to that application. Other uses will be apparent to those skilled in the art.

Changes and modifications to the described embodiment may be made without departing from the scope or spirit of the invention. The scope of the invention is intended to be limited solely by the scope of the appended claims.

The embodiments of the invention in which an exclusive property or privilege is claimed are defined as follows:

1. A rapid coupling for coupling a drive shaft to a driven shaft, comprising:

a coupling sleeve having a drive end with an end face, a driven end with an end face and an axial bore that extends from the drive end to the driven end and is sized to accommodate the drive shaft and the driven shaft and be axially slidable over the shafts, the driven end including slots for receiving driven pin ends affixed to the driven shaft;

key means for connecting the coupling sleeve to the drive shaft for rotation therewith, the key means permitting axial movement of the coupling sleeve while inhibiting rotational movement of the coupling sleeve on the drive shaft, at least one key way cooperating with the key means to permit axial movement of the coupling sleeve, the key way extending from the end face of the drive end to the end face of the driven end of the coupling sleeve; and locking means associated with the drive shaft for locking the coupling sleeve in a coupled position wherein the coupling sleeve receives an end of the driven shaft, the driven pin ends are received in the slots and the driven shaft is axially rotated with the drive shaft.

2. A rapid coupling for coupling a drive shaft to a driven shaft as claimed in claim 1 wherein the driven pin ends comprise a single pin that frictionally engages a radial bore in the driven shaft, the ends of the pin extending beyond the periphery of the driven shaft to be received in the slots.

3. A rapid coupling for coupling a drive shaft to a driven shaft as claimed in claim 1 wherein the key means comprises a pin frictionally engaged in a radial bore through the drive shaft, opposite ends of the pin extending beyond the periphery of the drive shaft to engage the at least one key ways in an inner wall of the coupling sleeve.

4. A rapid coupling for coupling a drive shaft to a driven shaft as claimed in claim 1 wherein the key means comprises at least one feather key retained in a key groove machined in the drive shaft, the at least one feather key being positioned on the drive shaft to engage at least one the key way in an inner wall of the coupling sleeve.

5. A rapid coupling for coupling a drive shaft to a driven shaft as claimed in claim 1 wherein the locking means associated with the drive shaft for locking the coupling sleeve in the coupled position comprises a radial bore through the drive shaft and a pin received in the radial bore, the radial bore being located in a position adjacent the drive end of the coupling sleeve when the coupling sleeve is in the coupled position so that the pin can be inserted to retain the coupling sleeve in the coupled position and removed for sliding the coupling sleeve to a decoupled position.

6. A rapid coupling for coupling a drive shaft to a driven shaft as claimed in claim 5 wherein the pin is a cotter pin.

7. A rapid coupling for coupling a drive shaft to a driven shaft as claimed in claim 6 wherein the cotter pin is a quick release, self-locking cotter pin.

8. A rapid coupling for coupling a drive shaft to a driven shaft supported by the drive shaft, comprising:

- a coupling sleeve having a drive end with an end face, a driven end with an end face and an axial bore that extends from the drive end to the driven end and is sized to accommodate the drive shaft and the driven shaft in an axially slidable relationship, the driven end including slots for receiving driven pin ends affixed to the driven shaft;
- a pin for connecting the coupling sleeve to the drive shaft for rotation therewith, the pin being received in a radial bore through the drive shaft and extending beyond a periphery of at least one side of the drive shaft, the pin engaging at least one key way in a wall of the axial bore in the coupling sleeve, the key way extending from the end face of the drive end to the end face of the driven end the coupling sleeve, thus permitting axial movement of the coupling sleeve while inhibiting rotational movement of the coupling sleeve on the drive shaft; and
- locking means associated with the drive shaft for locking the coupling sleeve in a coupled position wherein the coupling sleeve receives an end of the drive shaft, the driven pin ends are received in the slots and the driven shaft is supported for axial rotation with the drive shaft.

9. A rapid coupling for coupling a drive shaft to a driven shaft supported by the drive shaft as claimed in claim 8 wherein the locking means comprises a radial bore which pierces the drive shaft, the radial bore being located in an exposed position adjacent the drive end of the coupling sleeve when the coupling sleeve is in the coupled position, and a pin which is inserted in the bore to retain the coupling sleeve in the coupled position, the pin being selectively removable for permitting uncoupling of the driven shaft from the drive shaft.

10. A rapid coupling for coupling a drive shaft to a driven shaft supported by the drive shaft as claimed in claim 9 wherein the pin is a quick release, self-locking cotter pin.

11. A rapid coupling for coupling a drive shaft to a driven shaft supported by the drive shaft as claimed in claim 8 wherein the driven pin ends comprise a pin that extends through a radial bore in the driven shaft, the ends of the driven pin respectively extending beyond the periphery of the driven shaft to be engagable by the slots.

12. A rapid coupling for coupling a drive shaft to a driven shaft supported by the drive shaft, comprising:

- a coupling sleeve having a drive end with an end face, a driven end with an end face and an axial bore that extends from the drive end to the driven end and is sized to accommodate the drive shaft and the driven shaft and be axially slidable on the shafts, the driven end including slots for receiving driven pin ends affixed to the driven shaft;
- a pin for connecting the coupling sleeve to the drive shaft for rotation therewith, the pin being received in a radial bore through the drive shaft and extending beyond a periphery of each side of the drive shaft, the pin engaging opposed key ways in a wall of the axial bore in the coupling sleeve, the key ways extending from the end face of the drive end to the end face of the driven end of the coupling sleeve, thus permitting axial movement of the coupling sleeve on the drive shaft while inhibiting rotational movement of the coupling sleeve on the drift shaft; and
- a bore and pin combination associated with the drive shaft for locking the coupling sleeve in a coupled position wherein the coupling sleeve receives an end of the driven shaft, the driven pin ends are received in the slots and the driven shaft is supported for axial rotation with the drive shaft, the bore being an axial bore through the drive shaft located in an exposed position adjacent the drive end of the coupling sleeve when the coupling sleeve is in the coupled position.

13. A rapid coupling for coupling a drive shaft to a driven shaft supported by the drive shaft as claimed in claim 12 wherein the driven pin ends comprise a pin that extends through a radial bore in the driven shaft, the ends of the driven pin respectively extending beyond the periphery of the driven shaft to be engagable by the slots.

14. A rapid coupling for coupling a drive shaft to a driven shaft supported by the drive shaft as claimed in claim 12 wherein the pin in the bore and pin combination is a cotter pin.

15. A rapid coupling for coupling a drive shaft to a driven shaft supported by the drive shaft as claimed in claim 14 wherein the cotter pin is a quick release, self-locking cotter pin.

* * * * *